US009944275B2

(12) United States Patent
Tabata et al.

(10) Patent No.: US 9,944,275 B2
(45) Date of Patent: Apr. 17, 2018

(54) CONTROL DEVICE FOR HYBRID VEHICLE

(75) Inventors: Atsushi Tabata, Okazaki (JP); Tooru Matsubara, Toyota (JP); Koichi Okuda, Toyota (JP); Kenta Kumazaki, Toyota (JP); Tatsuya Imamura, Okazaki (JP); Keita Imai, Toyota (JP); Takeshi Kitahata, Toyota (JP); Shunya Kato, Toyota (JP); Yasuhiro Hiasa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/380,953

(22) PCT Filed: Feb. 28, 2012

(86) PCT No.: PCT/JP2012/055004
§ 371 (c)(1),
(2), (4) Date: Aug. 26, 2014

(87) PCT Pub. No.: WO2013/128587
PCT Pub. Date: Sep. 6, 2013

(65) Prior Publication Data
US 2015/0142232 A1 May 21, 2015

(51) Int. Cl.
*B60W 20/40* (2016.01)
*B60K 6/445* (2007.10)
*B60W 10/06* (2006.01)
*B60W 10/08* (2006.01)

(52) U.S. Cl.
CPC ............. *B60W 20/40* (2013.01); *B60K 6/445* (2013.01); *B60W 10/06* (2013.01); *B60W 10/08* (2013.01); *Y02T 10/6239* (2013.01); *Y02T 10/6286* (2013.01); *Y10S 903/93* (2013.01)

(58) Field of Classification Search
CPC ...... B60W 20/00; B60W 10/08; B60W 10/06; Y02T 10/6286; B60K 6/445
See application file for complete search history.

(56) References Cited

U.S. PATENT DOCUMENTS 6,131,538 A * 10/2000 Kanai .................... B60K 6/445
123/2
6,437,575 B1 * 8/2002 Lin .................. G01R 19/16538
324/428
(Continued)

FOREIGN PATENT DOCUMENTS

JP 57-166928 U 10/1982
JP 07-315078 A 12/1995
(Continued)

*Primary Examiner* — John Olszewski
*Assistant Examiner* — Thomas E Worden
(74) *Attorney, Agent, or Firm* — Dinsmore & Shohl LLP

(57) ABSTRACT

A control device of a hybrid vehicle includes an electric motor outputting a running torque at the time of motor running and a starting torque at engine start, in a state of the motor running using even the starting torque, the control device being configured to give a notification of the state to a driver when a charging capacity is smaller than a first predetermined value, and to start an engine when the charging capacity is smaller than a second predetermined value which is smaller than the first predetermined value.

10 Claims, 9 Drawing Sheets

(56) References Cited

U.S. PATENT DOCUMENTS

| | | | | |
|---|---|---|---|---|
| 7,722,497 B2* | 5/2010 | Tabata | B60K 6/445 | 477/3 |
| 7,877,184 B2* | 1/2011 | Watanabe | B60K 6/40 | 180/247 |
| 8,452,474 B2* | 5/2013 | Ogiso | B60K 6/48 | 180/65.21 |
| 8,499,547 B2* | 8/2013 | Mitsutani | B60K 6/445 | 60/284 |
| 8,738,209 B2* | 5/2014 | Oba | B60K 6/445 | 180/65.25 |
| 9,045,137 B2* | 6/2015 | Kabe | B60K 6/547 | |
| 9,440,641 B2* | 9/2016 | Kitabatake | B60K 6/445 | |
| 2003/0076071 A1* | 4/2003 | Kanno | H02J 7/1461 | 320/132 |
| 2004/0006419 A1* | 1/2004 | Kimura | B60K 6/445 | 701/101 |
| 2006/0071553 A1* | 4/2006 | Lengacher | B60P 1/4471 | 307/10.1 |
| 2007/0216312 A1* | 9/2007 | Ogata | B60K 6/48 | 315/131 |
| 2008/0004780 A1* | 1/2008 | Watanabe | B60K 6/365 | 701/54 |
| 2008/0009388 A1* | 1/2008 | Tabata | B60K 6/445 | 477/2 |
| 2008/0076623 A1* | 3/2008 | Tabata | B60K 6/445 | 477/5 |
| 2009/0140521 A1* | 6/2009 | Bryan | B60K 6/445 | 290/31 |
| 2009/0163317 A1* | 6/2009 | Goda | B60K 6/445 | 477/3 |
| 2009/0171522 A1* | 7/2009 | Luo | B60K 6/405 | 701/22 |
| 2009/0184578 A1* | 7/2009 | Owens | H02J 1/14 | 307/10.7 |
| 2009/0236160 A1* | 9/2009 | Tanaka | B60K 6/365 | 180/65.265 |
| 2010/0026222 A1* | 2/2010 | Yoshida | B60K 6/445 | 318/400.22 |
| 2010/0312422 A1* | 12/2010 | Imaseki | B60K 6/365 | 701/22 |
| 2011/0202210 A1* | 8/2011 | Goda | B60L 3/0046 | 701/22 |
| 2011/0241859 A1* | 10/2011 | Handa | B60K 6/448 | 340/438 |
| 2011/0320082 A1* | 12/2011 | Ishishita | B60K 6/445 | 701/22 |
| 2012/0065819 A1* | 3/2012 | Christman | B60W 10/06 | 701/22 |
| 2012/0159971 A1* | 6/2012 | Fink | B60P 3/20 | 62/56 |
| 2012/0303199 A1* | 11/2012 | Oba | B60K 6/445 | 701/22 |
| 2013/0073136 A1* | 3/2013 | Yamamoto | B60K 6/445 | 701/22 |
| 2014/0114523 A1* | 4/2014 | Hirasawa | B60K 6/445 | 701/22 |
| 2015/0142232 A1* | 5/2015 | Tabata | B60K 6/445 | 701/22 |
| 2015/0217756 A1* | 8/2015 | Kitabatake | B60W 10/06 | 701/22 |
| 2016/0352120 A1* | 12/2016 | Lovett | H02J 7/0047 | |
| 2017/0088003 A1* | 3/2017 | Yu | B60K 6/442 | |

FOREIGN PATENT DOCUMENTS

| | | |
|---|---|---|
| JP | 2000-023310 A | 1/2000 |
| JP | 2004-068675 A | 3/2004 |
| JP | 2006-298079 A | 11/2006 |
| JP | 3956489 B2 | 8/2007 |
| JP | 2009-137553 A | 6/2009 |
| JP | 2011-099363 A | 5/2011 |
| JP | 2011-189889 A | 9/2011 |

* cited by examiner

CONTROL DEVICE FOR HYBRID VEHICLE

TECHNICAL FIELD

The present invention relates to a control device of a hybrid vehicle including an electric motor outputting a running torque at the time of motor running and a starting torque at the engine start and particularly to setting of a motor running region with consideration given to the engine start.

BACKGROUND ART

A hybrid vehicle is well-known that includes an electric motor outputting a running torque at the time of motor running and a starting torque at the engine start. For example, this corresponds to a hybrid vehicle described in Patent Document 1. Patent Document 1 proposes that in a hybrid vehicle including an electric motor coupled via a clutch to an engine, the engine start is initiated when a margin torque is defined as a difference between an upper limit torque that can be output by the electric motor and a currently generated torque of the electric motor and is equal to or less than a motor torque (corresponding to a starting torque) required at the engine start. Therefore, in a technique described in Patent Document 1, an upper limit torque (referred to as a motor running available torque) usable as a running torque at the time of motor running is set as a torque value acquired from the upper limit torque of the electric motor such that a starting torque (e.g., a start compensation torque compensating a deceleration torque transmitted to drive wheels at the engine start (i.e., a drop in a drive torque associated with the engine start)) remains. In short, a start threshold value of the engine start during the motor running is set based on the starting torque. As a result, the vehicle of Patent Document 1 avoids occurrence of shock at the engine start (engine start shock) associated with a drop in the drive torque, for example.

PRIOR ART DOCUMENT

Patent Document

Patent Document 1: Japanese Laid-Open Patent Publication No. 2006-298079

SUMMARY OF THE INVENTION

Problem to be Solved by the Invention

Setting the motor running available torque by subtracting the starting torque from the upper limit torque of the electric motor means that the engine is started even though the motor running can actually be performed in a torque region exceeding the motor running available torque and fuel efficiency may deteriorate. Particularly when a large-capacity battery (i.e., an electric storage device giving/receiving electricity to/from the electric motor) is equipped, the motor running can be continued longer and, therefore, the deterioration in fuel efficiency due to staring of the engine more significantly appears. On the other hand, if the motor running available torque is set without giving consideration to the engine start, even the starting torque from the electric motor is diverted as the running torque and the drive torque may become insufficient at the engine start, resulting in an increase in the engine start shock.

The present invention was conceived in view of the situations and it is therefore an object of the present invention to provide a control device of a hybrid vehicle capable of satisfying both the improvement in fuel efficiency and the suppression of engine start shock.

Means for Solving the Problem

To achieve the object, the first aspect of the invention provides a control device of a hybrid vehicle including (a) an electric motor outputting a running torque at the time of motor running and a starting torque at engine start, characterized in that (b) in a state of the motor running using even the starting torque, the control device gives a notification of the state to a driver.

Effects of the Invention

Consequently, power of the electric motor can be utilized for the motor running to the maximum. Instead, the engine start shock may increase at the engine start; however, since a notification of the state of the motor running using even the starting torque to a driver is preliminarily made, a sense of discomfort to the engine start shock can be suppressed even though the engine start shock is increased as compared to when the notification of the state of the motor running using even the starting torque is not made to the driver. It is also conceivable that the notification to the driver causes the driver to reduce a drive request amount to the vehicle, and the engine start shock is suppressed or avoided by restraining or eliminating the starting torque used for the motor running. Therefore, both the improvement in fuel efficiency and the suppression of engine start shock can be satisfied.

To achieve the object, the second aspect of the invention provides a control device of a hybrid vehicle including (a) two electric motors outputting a running torque at the time of motor running, at least one of the two electric motors outputting a starting torque at engine start, characterized in that (b) in a state of the motor running using output torques from the two electric motors together, the control device gives a notification of the state to a driver.

Consequently, power of the two electric motors can be utilized for the motor running to the maximum. Instead, the engine start shock may increase at the engine start; however, since a notification of the state of the motor running using output torques from the two electric motors together to a driver is made, a sense of discomfort to the engine start shock can be suppressed even though the engine start shock is increased as compared to when the notification of the state of the motor running using output torques from the two electric motors together is not made to the driver. It is also conceivable that the notification to the driver causes the driver to reduce the drive request amount to the vehicle, and the engine start shock is suppressed or avoided by restraining or eliminating the starting torque used for the motor running. Therefore, both the improvement in fuel efficiency and the suppression of engine start shock can be satisfied.

The third aspect of the invention provides the control device of a hybrid vehicle recited in the first or second aspect of the invention, wherein when motor running is performed by using electric power stored by an external power source, the motor running is performed in a torque range in which the running torque and the starting torque are output, and wherein when motor running is performed by using electric power stored by power from the engine or driven force from a drive wheel side, the motor running is performed in a torque range in which the running torque is output. Consequently, in the case of running in a so-called plug-in hybrid system using the electric power stored by the external power source, since it is considered that the motor running can be continued relatively longer because, for example, the electric power available for supply to the electric motors is ensured in a relatively larger amount, it is useful to employ a technique in which the motor running is performed in the torque range capable of outputting the running torque and the starting torque, and expand the motor running region. On the other hand, in the case of running in a normal hybrid system using the electric power stored by the power from the engine or the driven force, since it is considered that the motor running cannot be continued so long because, for example, the electric power available for supply to the electric motors is not ensured as compared to the plug-in hybrid system, it is useful to employ a technique in which the motor running is performed in the torque range capable of outputting the running torque, and suppress or avoid the engine start shock at the engine start during the motor running.

The fourth aspect of the invention provides the control device of a hybrid vehicle recited in any one of the first to third aspects of the invention, wherein when the engine start is requested or when the engine start is predicted, the notification to a driver is started. Consequently, both the improvement in fuel efficiency and the suppression of engine start shock can properly be satisfied.

The fifth aspect of the invention provides the control device of a hybrid vehicle recited in any one of the first to fourth aspects of the invention, wherein the notification to the driver prompts an operation of reducing power of the electric motor required for the motor running. Consequently, it is expected that the notification to the driver causes the driver to reduce the drive request amount to the vehicle.

The sixth aspect of the invention provides the control device of a hybrid vehicle recited in any one of the first to fifth aspects of the invention, wherein a differential mechanism is included that has a plurality of rotating elements respectively coupled to a first electric motor and a second electric motor each acting as the electric motor and the engine, wherein the differential mechanism has a rotating element coupled to the first electric motor, a rotating element that is an output rotating member coupled to drive wheels in a power transmittable manner, and a rotating element coupled to a crankshaft of the engine as the plurality of the rotating elements, wherein the second electric motor is coupled to the drive wheels in a power transmittable manner, wherein a lock mechanism is further included that couples a rotating element of the plurality of the rotating elements to a non-rotating member when lock actuation is achieved, wherein the rotating element is other than the rotating elements coupled to the electric motor, and wherein when the engine is started during motor running using output torques from the first electric motor and the second electric motor together while the lock mechanism is in a locked state, the lock mechanism is brought into a non-lock state, the first electric motor outputs a cranking torque starting the engine, and the second electric motor compensates a reaction torque of the cranking torque. Consequently, not only because the second electric motor must secure the starting torque during running in preparation for the engine start, but also because the first electric motor outputs the cranking torque and therefore cannot output any drive torque at the engine start, the region capable of the motor running is substantially defined as the torque region capable of outputting the running torque of the second electric motor, which is the same as when one electric motor exists even though the two electric motors are present; however, this invention can satisfy both the maximized utilization of the power of the two electric motors for the motor running (i.e., the use of the output of the two electric motors for extracting the power during the motor running) and the suppression of the engine start shock.

The seventh aspect of the invention provides the control device of a hybrid vehicle recited in any one of the first to fifth aspects of the invention, wherein a differential mechanism is included that has a plurality of rotating elements respectively coupled to multiple electric motors acting as the electric motor and the engine, wherein a connecting/disconnecting clutch is included that connects/disconnects a power transmission path between the engine and a rotating element coupled to any of the multiple electric motors, wherein a rotating element coupled to none of the multiple electric motors is used as an output rotating member, wherein if the engine is started during the motor running while the vehicle is running with the connecting/disconnecting clutch released, the starting torque is output by the electric motor coupled to the connecting/disconnecting clutch while the connecting/disconnecting clutch is engaged. Consequently, when the motor running is performed by the multiple electric motors via the differential mechanism, not only because the starting torque must be secured during running in preparation for the engine start, but also because the vehicle must run in a state of equilibrium of the output torque between the multiple electric motors, the electric motor other than the electric motor outputting the starting torque must secure a torque as the unusable torque corresponding to the starting torque during running, and the torque region corresponding the secured portion cannot be used for the motor running; however, this invention eliminates the need for securing the starting torque and the unusable torque and therefore can satisfy both the maximum utilization of the power of the multiple electric motors for the motor running (i.e., the use of the power of the multiple electric motors for extracting the power during the motor running) and the suppression of the engine start shock.

The eighth aspect of the invention provides the control device of a hybrid vehicle recited in any one of the first to fifth aspects of the invention, wherein a connecting/disconnecting clutch is included that connects/disconnects a power transmission path between the engine and the electric motor, and wherein if the engine is started during the motor running using only the electric motor for running with the connecting/disconnecting clutch released, the starting torque is output by the electric motor while the connecting/disconnecting clutch is engaged. This can satisfy both the improvement in fuel efficiency from maximum utilization of the power of the electric motor for the motor running (i.e., expansion of the motor running region) and the suppression of engine start shock.

MODES FOR CARRYING OUT THE INVENTION

In the present invention, preferably, the hybrid vehicle may be a hybrid vehicle including an engine and an electric motor and capable of running with the electric motor or a so-called plug-in hybrid vehicle that is the hybrid vehicle having an electric storage device (such as a battery) mounted on the vehicle and chargeable from a charging stand, a household power source, etc. Particularly, since the plug-in hybrid vehicle is considered to have maximum input/output allowable values of the electric storage device made larger than the hybrid vehicle, the motor running can be performed in a region covering a higher request drive torque, for example. For example, if a plurality of electric motors is included, the electric motors can be restrained from increasing in size by enabling a plurality of electric motors to be used as drive force sources for running rather than making the electric motors larger for covering a higher request drive torque.

An example of the present invention will now be described in detail with reference to the drawings.

FIRST EXAMPLE

Figure 1:
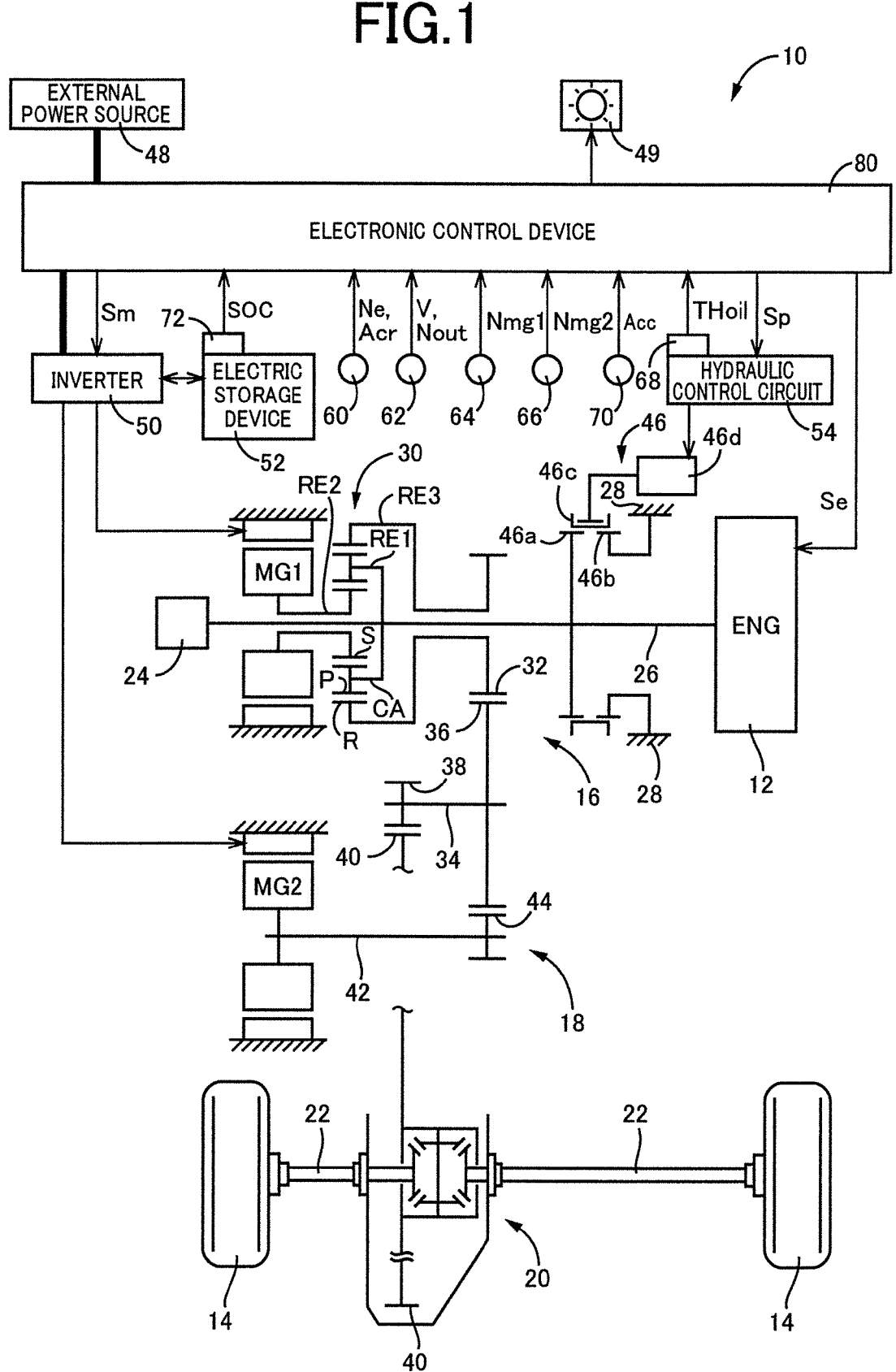
FIG. 1 is a diagram for explaining a general configuration of a vehicle to which the present invention is applied, and is a block diagram for explaining a main portion of a control system disposed in the vehicle.

FIG. 1 is a diagram for explaining a general configuration of a hybrid vehicle 10 (hereinafter referred to as a vehicle 10) to which the present invention is applied, and is a block diagram for explaining a main portion of a control system disposed for controlling the portions of the vehicle 10. In FIG. 1, the vehicle 10 includes a first drive portion 16, a second drive portion 18, a differential gear device 20, and a pair of left and right axles 22 disposed on a power transmission path between a drive force source for running, i.e., an engine 12, a first electric motor MG1, and a second electric motor, and a pair of left and right drive wheels 14. The vehicle 10 also includes an oil pump 24 rotationally driven by the engine 12 to generate an oil pressure used as an original pressure of a hydraulic control circuit 54 and to supply lubrication oil to the first drive portion 16, the second drive portion 18, etc. The vehicle 10 also includes a meshing clutch (dog clutch) 46 as a lock mechanism fixing a crankshaft 26 of the engine 12 to a housing 28 that is a non-rotating member.

The first drive portion 16 includes a planetary gear device 30 and an output gear 32. The planetary gear device 30 is a known single pinion type planetary gear device having a sun gear S that is a rotating element coupled to the first electric motor MG1, a ring gear R that is a rotating element coupled to the drive wheels 14 in a power transmittable manner and that is meshed with the sun gear S via a pinion gear P, and a carrier CA that is a rotating element coupled to the housing 28 by engagement actuation (lock actuation) of the meshing clutch 46 and that supports the pinion gear P in a rotatable and revolvable manner, as three rotating elements (rotating members), and acts as a differential mechanism generating a differential action. The carrier CA is coupled to the crankshaft 26 acting as an input shaft of the first drive portion 16 and the ring gear R is coupled to the output gear 32. Therefore, the planetary gear device 30 is a power distribution mechanism including the carrier CA acting as a first rotating element RE1 that is an input rotating member and that is coupled to the engine 12, the sun gear S acting as a second rotating element RE2, and the ring gear R acting as a third rotating element RE3 that is an output rotating member, so as to distribute power output from the engine 12 to the first electric motor MG1 and the output gear 32, and acts as an electric continuously variable transmission. The output gear 32 is meshed with a large diameter gear 36 disposed integrally with an intermediate output shaft 34 parallel to the crankshaft 26. A small diameter gear 38 disposed integrally with the intermediate output shaft 34 is meshed with a differential input gear 40 of the differential gear device 20.

The second drive portion 18 includes a second output gear 44 coupled to an MG2 output shaft 42 that is an output shaft of the second electric motor MG2. The second output gear 44 is meshed with the large diameter gear 36. As a result, the second electric motor MG2 is coupled to the drive wheels 14 in a power transmittable manner.

Although both the first electric motor MG1 and the second electric motor MG2 are motor generators having a function of a motor generating a drive force and a function of a generator (electric generator) generating a reaction force, the first electric motor MG1 at least has the function of a generator and the second electric motor MG2 at least has the function of a motor. Each of the first electric motor MG1 and the second electric motor MG2 is connected via an inverter unit 50 to an electric storage device 52.

In the vehicle 10 configured as described above, power from the engine 12 and the first electric motor MG1 in the first drive portion 16 is transmitted via the planetary gear device 30 to the output gear 32 and is transmitted via the large diameter gear 36 and the small diameter gear 38 disposed on the intermediate output shaft 34 to the differential input gear 40 of the differential gear device 20. Power from the second electric motor MG2 in the second drive portion 18 is transmitted via the MG2 output shaft 42 and the second output gear 44 to the large diameter gear 36 and is transmitted via the small diameter gear 38 to the differential input gear 40. Therefore, any of the engine 12, the first electric motor MG1, and the second electric motor MG2 may be used as the drive force source for running in the vehicle 10.

The meshing clutch 46 includes an engine side member 46a that includes a plurality of meshing teeth on the outer circumference and that is disposed to be integrally rotated around the same axis as the crankshaft 26, a housing side member 46b that includes a plurality of meshing teeth corresponding to the meshing teeth of the engine side member 46a and that is fixed to the housing 28, a sleeve 46c that includes a spline on an inner circumferential side meshed with the meshing teeth of the engine side member 46a and the housing side member 46b and that is disposed to be movable (slidable) in the axial direction relative to the engine side member 46a and the housing side member 46b while the spline is meshed with the meshing teeth of the engine side member 46a and the housing side member 46b, and an actuator 46d driving the sleeve 46c in the axial direction. The actuator 46d is a hydraulic actuator moving the sleeve 46c depending on a brake oil pressure Pb supplied from the hydraulic control circuit 54 between a state in which the spline disposed on the inner circumferential side is meshed with the meshing teeth of both the engine side member 46a and the housing side member 46b and a state in which the spline is meshed only with the meshing teeth of the housing side member 46b without being meshed with the meshing teeth of the engine side member 46a.

For example, when the brake oil pressure Pb supplied from the hydraulic control circuit 54 is increased and the sleeve 46c is moved by the actuator 46d to the state of meshing with the meshing teeth of both the engine side member 46a and the housing side member 46b, i.e., when the engagement actuation (lock actuation) is performed, the crankshaft 26 is fixed to the housing 28 via the meshing clutch 46 and, therefore, the crankshaft 26 is put into a relatively non-rotatable state to the housing 28. In short, the crankshaft 26 is fixed (locked) to the housing 28 by the engagement actuation of the meshing clutch 46. On the other hand, for example, when the brake oil pressure Pb supplied from the hydraulic control circuit 54 is decreased and the sleeve 46c is moved by a biasing force etc. of a return spring included in the actuator 46d to the state of meshing only with the meshing teeth of the housing side member 46b without being meshed with the engine side member 46a, i.e., when release actuation (non-lock actuation) is performed, the state of the crankshaft 26 fixed to the housing 28 by the meshing clutch 46 is canceled and, therefore, the crankshaft 26 is put into a relatively rotatable state to the housing 28. The configuration including the meshing clutch 46 as the lock mechanism can advantageously suppress dragging of the crankshaft 26 relative to the housing 28.

The vehicle 10 includes an electronic control device 80 as a control device controlling the portions of the vehicle 10. The electronic control device 80 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 80 provides vehicle control such as hybrid drive control related to the engine 12, the first electric motor MG1, and the second electric motor MG2 and is configured separately for output control of the engine 12 and output control of the electric motors MG1 and MG2 as needed. The electronic control device 80 is supplied with various signals (e.g., an engine rotation speed Ne and crank angle Acr, an output rotation speed Nout that is a rotation speed of the output gear 32 corresponding to a vehicle speed V, a first electric motor rotation speed Nmg1, a second electric motor rotation speed Nmg2, a lubrication oil temperature THoil that is temperature of lubrication oil of the first drive portion 16 etc., an accelerator opening degree Acc, and a state of charge (charging capacity) SOC of the electric storage device 52) based on detection values from sensors (e.g., a crank position sensor 60, an output rotation speed sensor 62, a first electric motor rotation speed sensor 64 such as a resolver, a second electric motor rotation speed sensor 66 such as a resolver, an oil temperature sensor 68, an accelerator opening degree sensor 70, and a battery sensor 72) disposed on the vehicle 10. The electronic control device 80 supplies various command signals (e.g., an engine control command signal Se, an electric motor control command signal Sm, and a hydraulic control command signal Sp) to devices (e.g., the engine 12, an indicator 49, the inverter 50, and the hydraulic control circuit 54) disposed on the vehicle 10.

Figure 2:
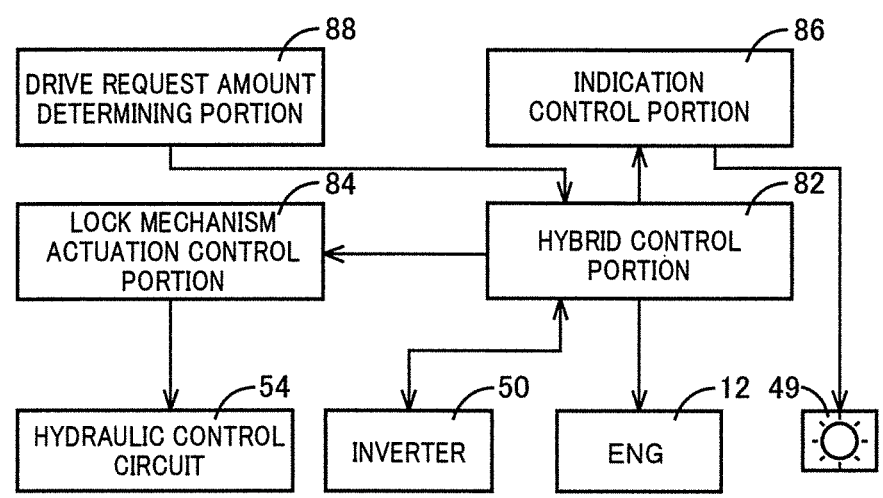
FIG. 2 is a function block diagram for explaining a main portion of a control function of an electronic control device.

FIG. 2 is a function block diagram for explaining a main portion of a control function of the electronic control device 80. In FIG. 2, a hybrid control means, i.e., a hybrid control portion 82 outputs the engine control command signal Se controlling opening/closing of an electronic throttle valve, a fuel injection amount, and ignition timing, for example, and provides the output control of the engine 12 so as to acquire a target value of an engine torque Te for generating a target engine power Pe*. The hybrid control portion 82 outputs to the inverter 50 the electric motor control command signal Sm controlling operations of the first electric motor MG1 and the second electric motor MG2 and provides the output control of the first electric motor MG1 and the second electric motor MG2 so as to acquire target values of a first electric motor torque Tmg1 and a second electric motor torque Tmg2.

Specifically, the hybrid control portion 82 calculates a request drive torque as a drive request amount to the vehicle 10 based on the accelerator opening degree Acc and the vehicle speed V and generates the request drive torque from at least one of the engine 12, the first electric motor MG1, and the second electric motor MG2 so as to achieve operation with lower fuel consumption and a smaller exhaust gas amount in consideration of a charging request value (charging request power) etc. For example, the hybrid control portion 82 selectively establishes depending on a running state a motor running mode for motor running (EV running) using at least only one electric motor of the first electric motor MG1 and the second electric motor MG2 as the drive force source for running with operation of the engine 12 stopped, an engine running mode (steady running mode) for engine running using at least the engine 12 as the drive force source for running by accepting a reaction force against the power of the engine 12 with electric generation of the first electric motor MG1 to transmit an engine direct torque to the output gear 32 while the second electric motor MG2 is driven by the generated electric power of the first electric motor MG1 to transmit a torque to the drive wheels 14, and an assist running mode (acceleration running mode) for running by further adding a drive torque of the second electric motor MG2 using electric power from the electric storage device 52 in the engine running mode. The hybrid control portion 82 establishes the motor running mode in the case of a motor running region in which the request drive torque is smaller than a threshold value obtained and stored empirically or in design in advance (i.e., predefined), and establishes the engine running mode or the assist running mode in the case of an engine running region in which the request drive torque is equal to or greater than the predefined threshold value. The drive request amount can be implemented by using not only the request drive torque at the drive wheels 14 but also a request drive force at the drive wheels 14, a request drive power at the drive wheels 14, a target torque of the drive force source for running (the engine 12, the first electric motor MG1, and the second electric motor MG2), etc. The drive request amount can be implemented by simply using the accelerator opening degree Acc, a throttle valve opening degree, an intake air amount, etc.

If the motor running mode is established, the hybrid control portion 82 further determines whether the mode is set to a combination mode in which the first electric motor torque Tmg1 and the second electric motor torque Tmg2 can be used together for running or a single mode in which only the second electric motor torque Tmg2 can be used for running. For example, in the motor running mode, the hybrid control portion 82 establishes the single mode if the request drive torque can be achieved solely by the second electric motor MG2, and establishes the combination mode if the request drive torque cannot be achieved solely by the second electric motor MG2. However, even when the request drive torque can be achieved solely by the second electric motor MG2, if an operating point of the second electric motor MG2 (e.g., an operation point of the second electric motor represented by the second electric motor rotation speed Nmg2 and the second electric motor torque Tmg2) is within a region predefined as operating points deteriorating an efficiency of the second electric motor MG2, or in other words, if better efficiency is acquired by using the first electric motor MG1 and the second electric motor MG2 together, the hybrid control portion 82 establishes the combination mode.

If the combination mode is established in the motor running mode, the hybrid control portion 82 causes the first electric motor MG1 and the second electric motor MG2 to share the request drive torque based on an operation efficiency of the first electric motor MG1 and the second electric motor MG2. For example, during the motor running in the combination mode, the hybrid control portion 82 obtains a fuel efficiency oriented torque sharing rate predefined based on the request drive torque at the vehicle speed V at the time and obtains respective sharing torques of the first electric motor MG1 and the second electric motor MG2 for the request drive torque based on the sharing rate. The hybrid control portion 82 controls the first electric motor MG1 and the second electric motor MG2 to output the sharing torques so that the motor running is performed.

During the motor running, the hybrid control portion 82 determines whether the electric storage device 52 must be charged by the engine 12, based on the charging capacity SOC of the electric storage device 52 based on the detection value from the battery sensor 72. For example, if an actual charging capacity SOC is smaller than a threshold value S1 predefined as a small charging capacity necessitating the charging of the electric storage device 52 by the power of the engine 12 during the motor running, the hybrid control portion 82 determines that the engine 12 must be started (i.e., the engine start is requested).

A lock mechanism actuation control means, i.e., a lock mechanism actuation control portion 84 controls the actuation of the meshing clutch 46. Specifically, the lock mechanism actuation control portion 84 controls the brake oil pressure Pb supplied from the hydraulic control circuit 54 to the actuator 46d to control the engagement actuation or the release actuation of the meshing clutch 46, i.e., fixation, or release of the fixation, of the crankshaft 26 to the housing 28. For example, if the hybrid control portion 82 performs the motor running in the combination mode, the lock mechanism actuation control portion 84 increases the brake oil pressure Pb supplied from the hydraulic control circuit 58 to the actuator 46d to cause the engagement actuation of the meshing clutch 46, thereby fixing the crankshaft 26 to the housing 28. If the hybrid control portion 82 performs the engine running or the motor running in the single mode, the lock mechanism actuation control portion 84 reduces the brake oil pressure Pb to cause the release actuation of the meshing clutch 46, thereby releasing the fixation of the crankshaft 26 to the housing 28.

Describing operation of the vehicle 10 in the engine running mode, the first electric motor torque Tmg1 is input to the sun gear S for the engine torque Te input to the carrier CA. In this case, for example, control of setting the operation point of the engine 12 represented by the engine rotation speed Ne and the engine torque Te to the operating point with the best fuel efficiency can be provided through power running control or reaction force control of the first electric motor MG1. This kind of hybrid format is referred to as a mechanical distribution type or a split type. Describing operation of the vehicle 10 in the motor running mode in the single mode, the drive of the engine 12 is not performed (i.e., the engine 12 is put into an operation stop state) and the rotation speed thereof is set to zero. In this state, power running torque of the second electric motor MG2 is transmitted as a drive force in the vehicle forward direction to the drive wheels 14. The first electric motor MG1 is put into a no-load state (made free).

Figure 3:
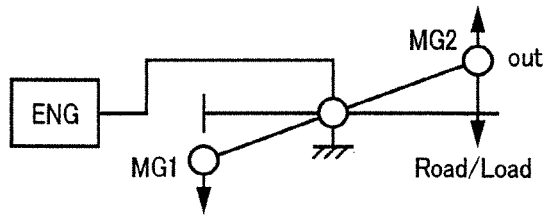
FIG. 3 is a collinear diagram capable of representing relative rotation speeds of rotating elements in a planetary gear device, the collinear diagram illustrating a running state when a meshing clutch is engaged.

Describing operation of the vehicle 10 in the motor running mode in the combination mode with reference to a collinear diagram of FIG. 3, the drive of the engine 12 is not performed and the rotation speed thereof is set to zero. The meshing clutch 46 is caused to perform the engagement actuation by the lock mechanism actuation control portion 84 and the engine 12 is locked to be non-rotatable. In the state of the engagement actuation of the meshing clutch 46, the power running torque of the second electric motor MG2 is transmitted as a drive force in the vehicle forward direction to the drive wheels 14. Reaction torque of the first electric motor MG1 is transmitted as a drive force in the vehicle forward direction to the drive wheels 14. Therefore, when the crankshaft 26 is locked by the meshing clutch 46, the vehicle 10 can use the first electric motor MG1 and the second electric motor MG2 together as the drive force source for running. As a result, if the electric storage device 52 has a larger capacity (higher output power) in a plug-in hybrid vehicle employing a so-called plug-in hybrid system allowing the electric storage device 52 to be charged from an external power source 48 (see FIG. 1) such as a charging stand and a household power source, higher output power of motor running can be realized while the second electric motor MG2 is restrained from increasing in size.

Figure 4:
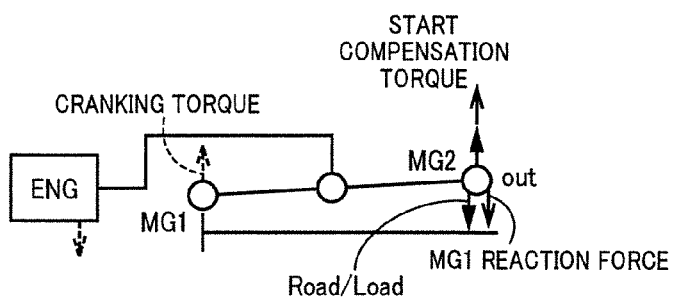
FIG. 4 is a diagram illustrating an example of state of each torque at the engine start on a collinear diagram like FIG. 3.

If the engine start is performed during the motor running in the combination mode, for example, if the engine start is requested because the charging capacity SOC becomes smaller than the threshold value S1, the release actuation of the meshing clutch 46 must first be performed for the engine start. Specifically, returning to FIG. 2, if the hybrid control portion 82 determines that the charging capacity SOC is smaller than the threshold value S1 during the motor running, the lock mechanism actuation control portion 84 provides control of releasing the fixation by the meshing clutch 46. After the meshing clutch 46 is released, as depicted in FIG. 4, the hybrid control portion 82 causes the first electric motor MG1 to output a cranking torque for raising the engine rotation speed Ne by an increase in the first electric motor rotation speed Nmg1. When the engine rotation speed Ne increases and becomes equal to or greater than a predetermined engine rotation speed at which the engine 12 is capable of self-sustaining operation or complete explosion, the hybrid control portion 82 injects fuel to the engine 12 and ignites the engine 12 to start the engine 12. In such engine start control, as depicted in FIG. 4, a reaction torque (cranking reaction torque, MG1 reaction torque) against the cranking torque from the first electric motor MG1 appears on the output gear 32 side and, therefore, the hybrid control portion 82 causes the second electric motor MG2 to output a start compensation torque for canceling (offsetting) the cranking reaction torque at the engine start. In short, since the cranking reaction torque acts as a deceleration torque transmitted to the drive wheels 14 and generates a drop in the drive torque, the second electric motor MG2 is caused to output the start compensation torque for offsetting the deceleration torque (i.e., compensating a drop in the drive torque associated with the engine start). Both the cranking torque and the start compensation torque are the starting torque at the engine start. As described above, the first electric motor MG1 and the second electric motor MG2 are electric motors outputting the running torque (drive torque) at the time of the motor running and the starting torque at the engine start.

It is proposed as a known technique (conventional example) that a torque value is acquired by subtracting the start compensation torque from an upper limit torque that can be output by an electric motor and is set as an engine start threshold value for determining an engine start so as to start an engine while an engine start shock associated with a drop in the drive torque is avoided or suppressed without shortage of the electric motor torque Tmg at the time of cranking.

On the other hand, in the vehicle 10 of this example, as depicted in FIG. 4, the first electric motor MG1 outputs the cranking torque at the engine start and therefore cannot output any drive torque because of the configuration. Thus, when the known technique is employed, the second electric motor MG2 must secure the start compensation torque in preparation for the engine start during running while the first electric motor MG1 must prepare for the cranking of the engine and, therefore, as depicted in FIG. 5 (see particularly, a conventional example), a motor running region is substantially defined as a torque region equal to or less than the engine start threshold value acquired by subtracting the start compensation torque from an MG2 upper limit torque, which is the same as when one electric motor exists even though two electric motors are present.

Figure 5:
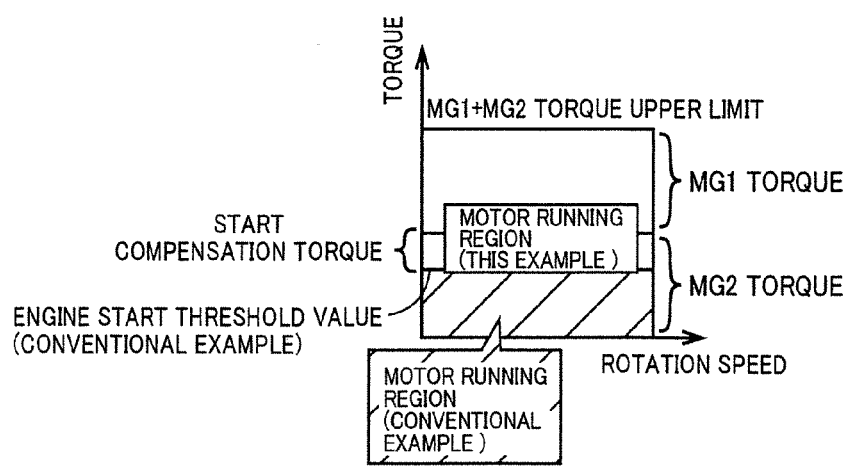
FIG. 5 is a diagram for explaining a motor running region by comparison between this example and a conventional example.

In this regard, as depicted in FIG. 5, the vehicle 10 of this example employs a new technique of defining a region of the total upper limit torque of the two electric motors MG1, MG2 (the entire region in which the electric motors MG1, MG2 can output torque, i.e., a torque range capable of outputting the running torque and the starting torque) as a motor running region capable of the motor running. By employing such a new technique, the power of the two electric motors MG1, MG2 can be utilized for the motor running to the maximum. On the other hand, while even the starting torque is used in the two electric motors MG1, MG2 for the motor running or, from another view point, while the output torques from the two electric motors MG1, MG2 are actually used together for the motor running, the engine start shock may increase at the engine start. While even the starting torque is used in the two electric motors MG1, MG2 for the motor running and while the output torques from the two electric motors MG1, MG2 are actually used together for the motor running, a high-load operation corresponding to a high drive request amount is performed by the two electric motors MG1, MG2, and therefore, this state is referred to as a high-load operation state of the electric motors MG.

Thus, in the high-load operation state of the electric motors MG the electronic control device 80 of this example notifies a driver of being in the state. This is performed from the viewpoint that if the electronic control device 80 notifies the driver of being in the high-load operation state of the electric motors MG a sense of discomfort to the engine start shock will be suppressed even though the engine start shock increases at the engine start as compared to when the electronic control device 80 does not notify the driver. Alternatively, since this also means that the electronic control device 80 notifies the driver of possibility of occurrence of the engine start shock at the engine start, it can be considered that a sense of discomfort to the engine start shock is suppressed as compared to when the electronic control device 80 does not notify the driver. Alternatively, since this may prompt the driver to reduce the drive request amount by returning an accelerator etc., it is expected that the engine start shock at the engine start is suppressed or avoided by suppressing or eliminating the high-load operation state of the electric motors MG.

Since the technique of notifying a driver of being in the high-load operation state is a technique consequently leading to the suppression of the engine start shock, the notification to the driver may be started when the engine start is requested. The notification may be made to actively prompt the operation of reducing the drive request amount such that the engine start shock is suppressed or avoided at the engine start.

In the high-load operation state of the electric motors MG, the electronic control device 80 of this example may notify the driver of being in the state and delay the engine start (e.g., the engine start command) until an operating region of the second electric motor MG2 falls within the torque region capable of securing the start compensation torque (e.g., a motor running region in a conventional example; see FIG. 5) for a request of the engine start.

If the "region of the total upper limit torque of the two electric motors MG1, MG2; see FIG. 5" is defined as the motor running region, it is desirable to include the electric storage device 52 capable of suitable output and, therefore, the new technique is usefully employed in a plug-in hybrid vehicle. Although the plug-in hybrid vehicle can perform the motor running by using electric power stored into the electric storage device 52 from the external power source 48 in a plug-in hybrid system, this is not a limitation and the plug-in hybrid vehicle can perform the motor running by using regenerative electric power stored in a normal hybrid system charging the electric storage device 52 with the power from the engine 12 or the driven force from the drive wheel 14 side. Therefore, if the motor running is performed by using the electric power stored in the plug-in hybrid system associated with relatively larger capacity and larger output, it is desirable to perform the motor running in the region of the total upper limit torque of the two electric motors MG1, MG2 (corresponding to the new technique). On the other hand, if the motor running is performed by using the electric power stored in the normal hybrid system associated with relatively smaller capacity and smaller output, it is desirable to perform the motor running in the torque range in which the second electric motor MG2 can output the running torque (i.e., the known method in which a torque region equal to or less than the set engine start threshold value is defined as the motor running region).

Whether electric power is stored in the plug-in hybrid system or in the normal hybrid system is clarified by monitoring input/output of electric power in the electric storage device 52. The electric storage device 52 may include a battery A charged with electric power in the plug-in hybrid system and a battery B charged with electric power in the normal hybrid system. This leads to further clarification of which system the electric power is stored in. The vehicle 10 may include a mode switch to perform the new technique if a plug-in hybrid mode (PHV mode) is selected and to perform the known technique when a hybrid mode (HV mode) is selected. The mode switch may be a switch selecting the PHV mode of using electric power stored by the external power source 48 for the motor running and the HV mode of using electric power stored by the power from the engine 12 or the driven force from the drive wheel 14 side for the motor running.

When the charging capacity SOC becomes smaller than the threshold value S1 and the engine start is requested, if the engine start is delayed until the operating region of the second electric motor MG2 falls within the torque region capable of securing the start compensation torque, the charging capacity SOC is further reduced. Although it is contemplated that a certain degree of reduction is allowed in the electric storage device 52 with a relatively larger capacity, when the charging capacity SOC falls below a limit threshold value S2 smaller than the threshold value S1, it is desirable to start the engine even in such a state that the engine start shock increases because the start compensation torque is not secured. Therefore, when the engine start is delayed, if the necessity of engine start further increases (e.g., the charging capacity SOC becomes lower than the limit threshold value S2), the electronic control device 80 starts the engine 12.

Figure 6:
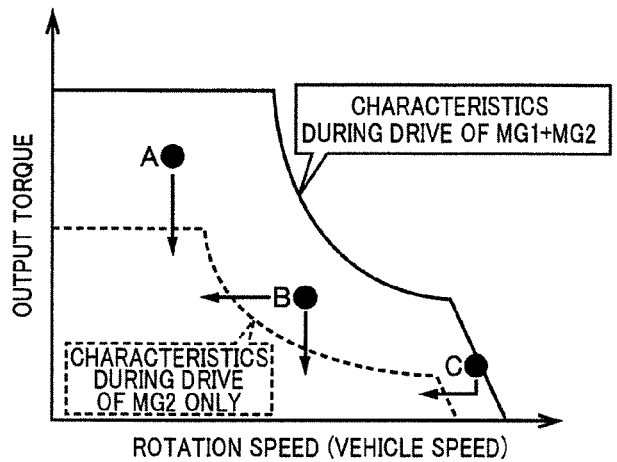
FIG. 6 is a diagram of characteristics during drive of the electric motors, the diagram being an example used for explaining that a high-load operation state is eliminated in different conditions in accordance with differences in the running state.

More specifically, returning to FIG. 2, if the hybrid control portion 82 determines that the actual charging capacity SOC is smaller than the threshold value S1 during the motor running in the combination mode, an indication control means, i.e., an indication control portion 86 notifies a driver to suppress or eliminate the high-load operation state of the electric motors MG. The indication control portion 86 notifies the driver, for example, solely by lighting or blinking the indicator 49 (see FIG. 1), producing a sound or voice from a buzzer, a speaker, etc., or vibrating a driver's seat etc., or by a combination thereof. More specifically, to facilitate the response from the driver, the notification to the driver may be made such that a method of suppressing or eliminating the high-load operation state is indicated. For example, as depicted on a diagram of characteristics during drive of the electric motors of FIG. 6, the high-load operation state is eliminated in different conditions (arrows of FIG. 6) in accordance with differences in the running state (e.g., points A, B, and C of FIG. 6) and, therefore, the notification is made depending on each condition. In the running state at the point A associated with a relatively low vehicle speed and at the point B associated with a relatively intermediate vehicle speed, the notification is made by producing a voice prompting the driver to return the accelerator (e.g., "please return the accelerator"), by emitting a buzzer sound intermittently at relatively long intervals, or by blinking the indicator 49 at relatively long intervals. Alternatively, in the running state at the point B associated with a relatively intermediate vehicle speed, the notification is made by producing a voice prompting the driver to reduce the vehicle speed V (e.g., "please slow down the vehicle"), by emitting a buzzer sound intermittently at relatively short intervals, or by blinking the indicator 49 at relatively short intervals. In the running state at the point C associated with a relatively high vehicle speed, the notification is made by producing a voice prompting the driver to return the accelerator and reduce the vehicle speed V (e.g., "please return the accelerator and slow down the vehicle"), by emitting a continuing buzzer sound, or by lighting the indicator 49. In the case of running through known auto-cruise control, an operation of canceling the auto-cruise control may be prompted or the auto-cruise control may be canceled to facilitate a reduction in the vehicle speed V.

If the hybrid control portion 82 determines that the actual charging capacity SOC is smaller than the threshold value S1, a drive request amount determining means, i.e., a drive request amount determining portion 88 determines whether the drive request amount is smaller than a predetermined request amount defined in advance. The predetermined request amount is a maximum drive request amount within a range in which the second electric motor MG2 can secure the start compensation torque, for example, and is a drive request amount corresponding to the engine start threshold value. For example, if the request drive torque is used as the drive request amount, the predetermined request amount is a start compensation torque; if the accelerator opening degree Acc is used as the drive request amount, the predetermined request amount is a predetermined accelerator opening degree θ1 corresponding to the start compensation torque; or if the request drive power (request output) is used as the drive request amount, the predetermined request amount is a predetermined request output P1 corresponding to the start compensation torque.

If the drive request amount determining portion 88 determines that the drive request amount is smaller than the predetermined request amount, the hybrid control portion 82 provides a sequence of the engine start control through rotation speed control of the first electric motor MG1 such that the engine 12 is ignited after the engine rotation speed Ne is increased by the cranking torque of the first electric motor MG1 while reaction force is accepted by the second electric motor MG2. On the other hand, if the drive request amount determining portion 88 determines that the drive request amount is equal to or greater than the predetermined request amount, the hybrid control portion 82 determines whether the actual charging capacity SOC is smaller than the limit threshold value S2. If it is determined that the actual charging capacity SOC is smaller than the limit threshold value S2, the hybrid control portion 82 provides a sequence of the engine start control through the rotation speed control of the first electric motor MG1.

Figure 7:
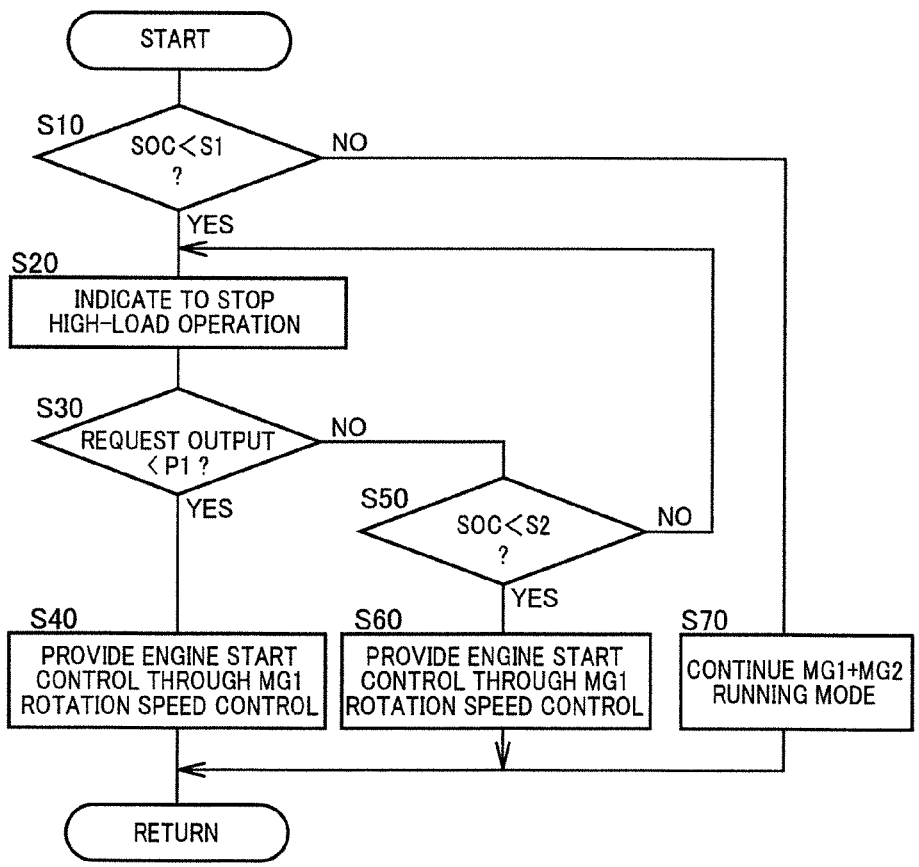
FIG. 7 is a flowchart for explaining a main portion of the control operation of the electronic control device, i.e., the control operation for satisfying both the improvement in fuel efficiency and the suppression of engine start shock.
Figure 8:
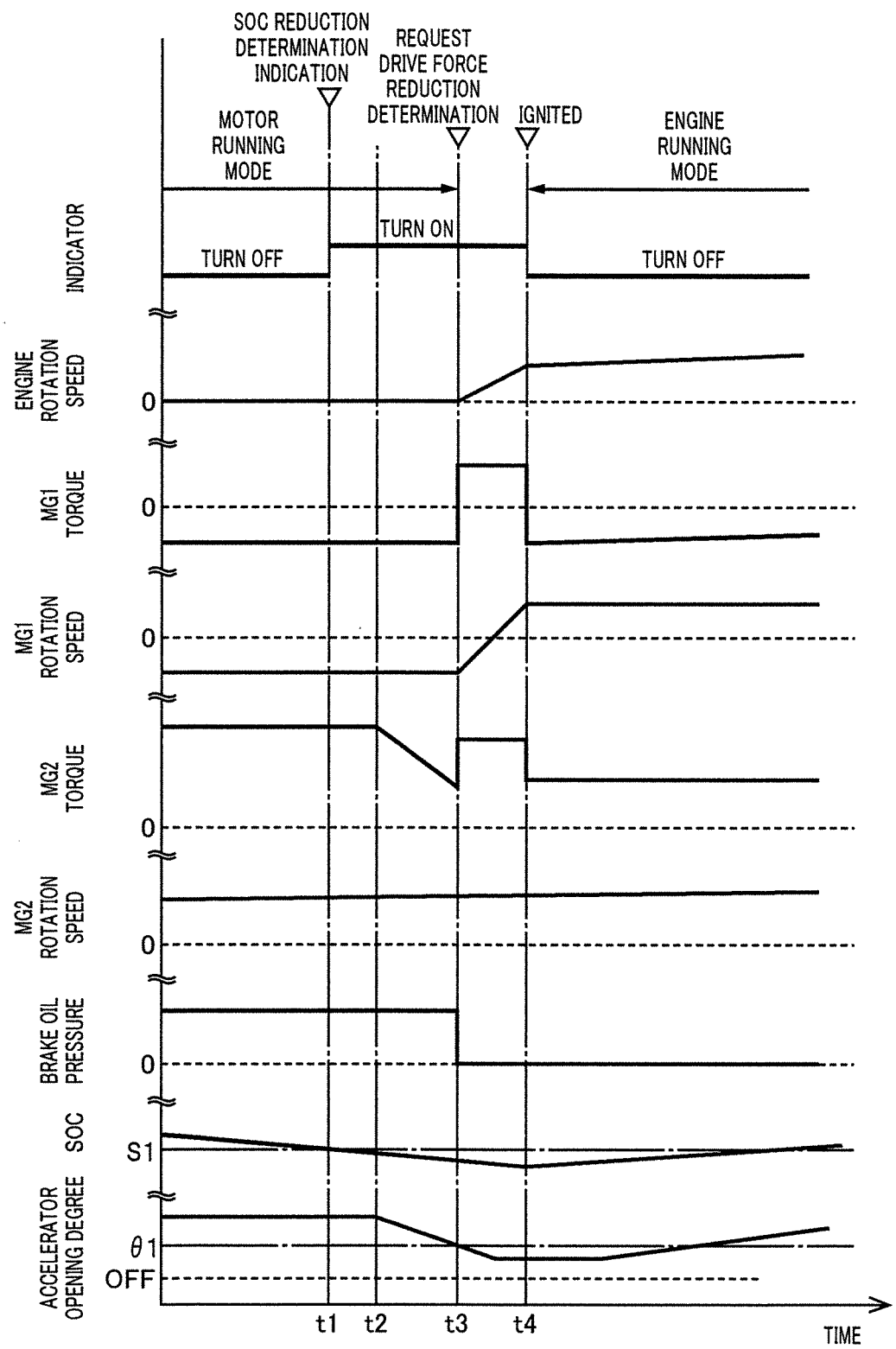
FIG. 8 is a time chart when the control operation depicted in the flowchart of FIG. 7 is executed.

FIG. 7 is a flowchart for explaining a main portion of the control operation of the electronic control device 80, i.e., the control operation for satisfying both the improvement in fuel efficiency and the suppression of engine start shock, and is repeatedly executed with an extremely short cycle time, for example, on the order of a few msec to a few tens of msec. The flowchart of FIG. 7 is based on the premise of the motor running in the combination mode. FIG. 8 is a time chart when the control operation depicted in the flowchart of FIG. 7 is executed.

In FIG. 7, first, at step (hereinafter, step will be omitted) S10 corresponding to the hybrid control portion 82, for example, it is determined whether the actual charging capacity SOC is smaller than the threshold value S1 during the motor running in the combination mode. In other words, it is determined whether the engine 12 must be started for charging the electric storage device 52. It is predicted whether the two electric motors MG1, MG2 will no longer be used for running as the charging capacity SOC decreases during running in the high-load operation state of the electric motors MG. If the determination of S10 is affirmative, at S20 corresponding to the indication control portion 86, a notification is made to a driver that prompts elimination (stop) of the high-load operation state of the electric motors MG (time t1 of FIG. 8). At S30 corresponding to the drive request amount determining portion 88, it is determined whether the drive request amount (e.g., the request drive torque, the accelerator opening degree Acc, and the request output) is smaller than the predetermined request amount (such as the engine start threshold value, the predetermined accelerator opening degree θ1, and the predetermined request output P1). If the determination of S30 is affirmative (time t3 of FIG. 8), at S40 corresponding to the lock mechanism actuation control portion 84 and the hybrid control portion 82, the brake oil pressure Pb supplied to the actuator 46d is reduced to release the meshing clutch 46 and, after the release of the meshing clutch 46, a sequence of the engine start control is provided through the rotation speed control of the first electric motor MG1 (time t3 to time t4 of FIG. 8). On the other hand, if the determination of S30 is negative, at S50 corresponding to the hybrid control portion 82, it is determined whether the actual charging capacity SOC is smaller than the limit threshold value S2, for example. If the determination of S50 is negative, the operation is returned to S20 and, if affirmative, at S60 corresponding to the lock mechanism actuation control portion 84 and the hybrid control portion 82, as is the case with S40, the meshing clutch 46 is released and the sequence of the engine start control is provided through the rotation speed control of the first electric motor MG1. On the other hand, if the determination of S10 is negative, at S70 corresponding to the hybrid control portion 82, the motor running mode using the two electric motors MG1, MG2 together is continued without a change.

As depicted in FIG. 8, since the charging capacity SOC becomes lower than the threshold value S1, the indicator 49 is turned on to suppress or eliminate the high-load operation state of the electric motors MG (time t1 of FIG. 8). At this time point, the engine start is put on standby until the drive request amount is made smaller than the predetermined request amount by a driver's operation. When a driver's reduction operation of the accelerator (after time t2 of FIG. 8) subsequently reduces the accelerator opening degree Acc lower than the predetermined accelerator opening degree θ1 (time t3 of FIG. 8), the brake oil pressure Pb is reduced to release the meshing clutch 46 and the sequence of the engine start control is provided through the rotation speed control of the first electric motor MG1 (time t3 to time t4 of FIG. 8). During this period, the torque corresponding to the start compensation torque for canceling the cranking reaction torque and the running torque output by the first electric motor MG1 until then is added to the second electric motor torque Tmg2 of time t3 of FIG. 8 and output from the second electric motor MG2. When the engine 12 is started (time t4 of FIG. 8), the indicator 49 is turned off (after time t4 of FIG. 8).

As described above, according to this example, the power of the two electric motors MG1, MG2 can be utilized for the motor running to the maximum. Instead, the engine start shock may increase at the engine start; however, since a notification of the high-load operation state to a driver is preliminarily made, a sense of discomfort to the engine start shock can be suppressed even though the engine start shock is increased as compared to when the notification of the high-load operation state is not made to the driver. It is also conceivable that the notification to the driver causes the driver to reduce the drive request amount, and the engine start shock is suppressed or avoided by restraining or eliminating the starting torque used for the motor running. Therefore, both the improvement in fuel efficiency and the suppression of engine start shock can be satisfied.

According to this example, the new technique is implemented if the motor running is performed by using the electric power stored by the external power source 48, while the known technique is implemented if the motor running is performed by using the electric power stored by the power from the engine 12 or the driven force from the drive wheel 14 side and, therefore, in the case of running in the so-called plug-in hybrid system, since it is considered that the motor running can be continued relatively longer because, for example, the electric power available for supply to the electric motors MG is ensured in a relatively larger amount, it is useful to employ the new technique and expand the motor running region. On the other hand, in the case of running in the normal hybrid system, since it is considered that the motor running cannot be continued so long because, for example, the electric power available for supply to the electric motors MG is not ensured as compared to the plug-in hybrid system, it is useful to employ the known technique and suppress or avoid the engine start shock at the engine start during the motor running.

When the motor running is performed by the two electric motors MG1, MG2 in the state of the lock actuation of the meshing clutch 46, if the known technique is employed, not only because the second electric motor MG2 must secure the start compensation torque during running in preparation for the engine start, but also because the first electric motor MG1 outputs the cranking torque and therefore cannot output any drive torque at the engine start, the motor running region is substantially defined as the torque region capable of outputting the running torque of the second electric motor MG2, which is the same as when one electric motor MG2 exists even though the two electric motors MG1, MG2 are present; however, this example can satisfy both the maximized utilization of the power of the two electric motors MG1, MG2 for the motor running (i.e., the use of the output of the two electric motors MG1, MG2 for extracting the power during the motor running) and the suppression of the engine start shock.

According to this example, if the engine start is requested, the notification to the driver is started and, therefore, both the improvement in fuel efficiency and the suppression of engine start shock can properly be satisfied.

According to this example, since the notification to the driver prompts the operation of reducing the power of the electric motors MG required for the motor running, it is expected that the notification to the driver causes the driver to reduce the drive request amount.

Another example of the present invention will be described. In the following description, the portions mutually common to the examples are denoted by the same reference numerals and will not be described.

SECOND EXAMPLE

Figure 9:
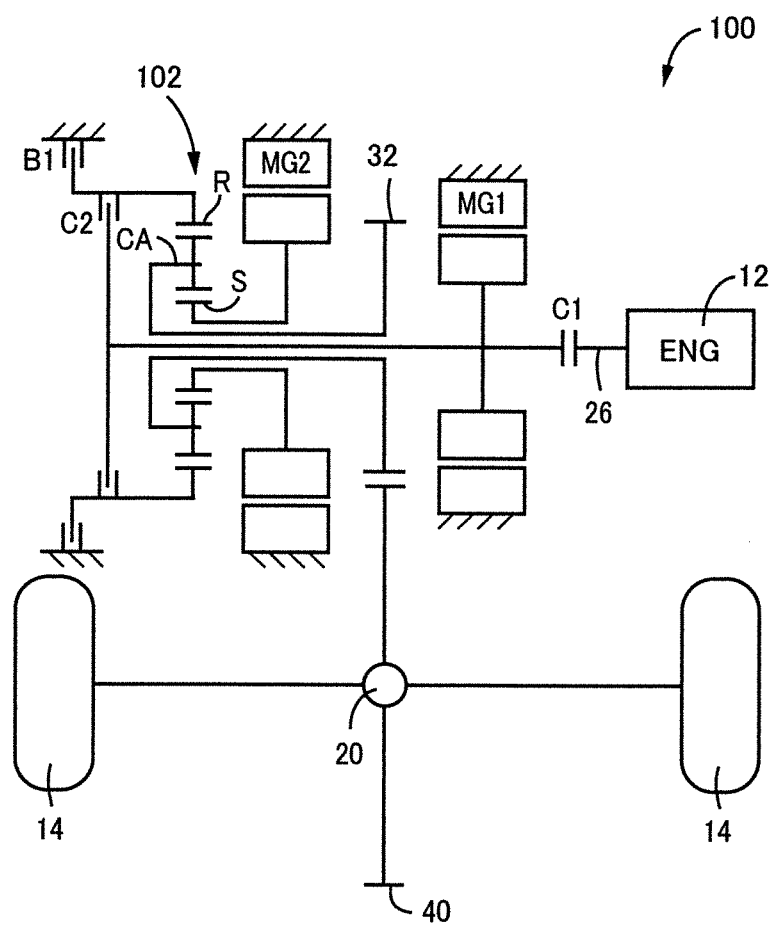
FIG. 9 is a diagram for explaining a general configuration of another hybrid vehicle to which the present invention is applied.

FIG. 9 is a diagram for explaining a general configuration of another hybrid vehicle 100 (hereinafter referred to as a vehicle 100) to which the present invention is applied and, as depicted in FIG. 9, although the vehicle 100 includes a planetary gear device 102 as a differential mechanism as is the case with the vehicle 10, a coupling relationship of the engine 12, the first electric motor MG1, and the second electric motor MG2 to the planetary gear device 102 is different from the vehicle 10. In particular, the engine 12 and the first electric motor MG1 are indirectly coupled via a clutch C1 and also coupled to the same rotating element (ring gear R) of the planetary gear device 102. The rotating element (carrier CA) of the planetary gear device 102 coupled to none of a plurality of the electric motors MG1, MG2 is coupled as an output rotating member to the output gear 32. The clutch C1 acts as a connecting/disconnecting clutch connecting/disconnecting a power transmission path between the engine 12 and the first electric motor MG1. The vehicle 100 can achieve, for example, a motor running mode and an engine running mode (e.g., a series hybrid running mode and a parallel hybrid running mode) by switching respective engagement states of the clutch C1, a clutch C2, and a brake B1 and switching respective operation states of the engine 12, the first electric motor MG1, and the second electric motor MG2. In particular, by releasing the clutch C1 and the brake B1 and engaging the cultch C2, as depicted in a collinear diagram of FIG. 10, the motor running can be performed for running with only a plurality of the electric motors (the first electric motor MG1 and the second electric motor MG2) used as the drive force sources for running while the clutch C1 is released (corresponding to the combination mode in the motor running mode).

Figure 11:
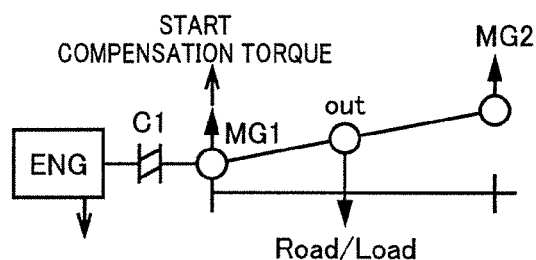
FIG. 11 is a diagram illustrating an example of state of each torque at the engine start on a collinear diagram like FIG. 10.

The following discusses the case that the engine start is requested during the motor running in the combination mode. In such a case, as depicted in FIG. 11, the electronic control device 80 engages the clutch C1 to raise the engine rotation speed Ne for the engine start. Since the torque raising the engine rotation speed Ne is the first electric motor torque Tmg1 transmitted toward the engine 12 depending on a torque capacity of the clutch C1, the torque acts as a deceleration torque transmitted to the drive wheels 14 and generates a drop in the drive torque. Therefore, the first electric motor MG1 is caused to output a start compensation torque for offsetting the deceleration torque. As described above, the first electric motor MG1 is an electric motor outputting the running torque at the time of the motor running and the starting torque at the engine start.

Figure 10:
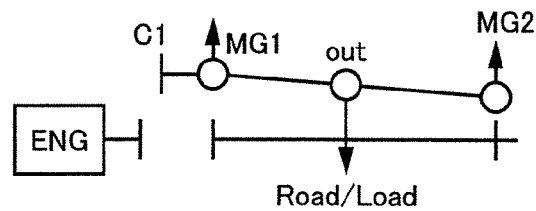
FIG. 10 is a collinear diagram capable of representing relative rotation speeds of rotating elements, the collinear diagram illustrating a running state at the time of the motor running.

It is proposed as a known technique to start the engine while the engine start shock is avoided or suppressed by setting the engine start threshold value to a torque value acquired by subtracting the start compensation torque from an upper limit torque that can be output by an electric motor. On the other hand, because of the configuration, the vehicle 100 of this example must run in a state of equilibrium (balance) between the first electric motor MG1 and the second electric motor MG2 as depicted in FIG. 10. Therefore, if the known technique is employed, the first electric motor MG1 must secure the start compensation torque during running in preparation for the engine start while the second electric motor MG2 has a torque balancing with the start compensation torque automatically limited as an unusable torque and, therefore, as depicted in FIG. 12 (see particularly, a conventional example), a motor running region is defined as a torque region equal to or less than an engine start threshold value acquired by subtracting the start compensation torque and the unusable torque from the total upper limit torque of the two electric motors MG1, MG2.

Figure 12:
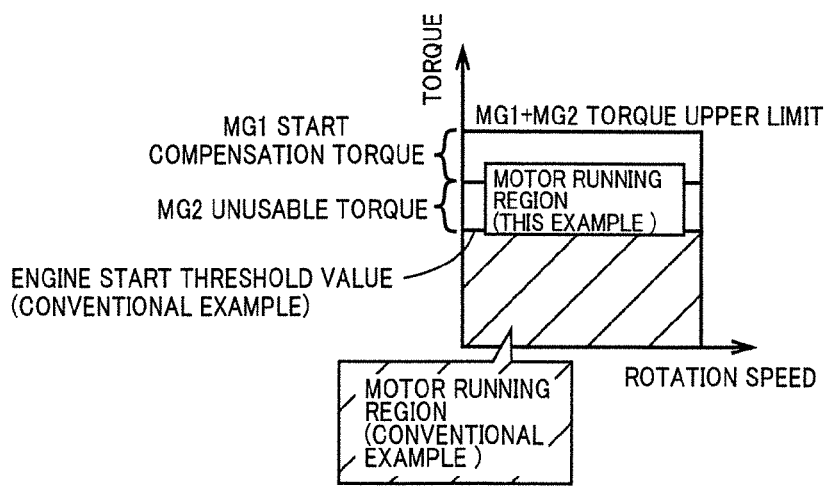
FIG. 12 is a diagram for explaining a motor running region by comparison between this example and a conventional example.

In this regard, as depicted in FIG. 12, the vehicle 100 of this example employs a new technique of defining a region of the total upper limit torque of the two electric motors MG1, MG2 as the motor running region. By employing such a new technique, the power of the two electric motors MG1, MG2 can be utilized for the motor running to the maximum. On the other hand, in the high-load operation state of the electric motors MG the engine start shock may increase at the engine start. Thus, in the high-load operation state of the electric motors MG, the electronic control device 80 of this example notifies a driver of being in the state.

In this example, as is the case with the example, both the improvement in fuel efficiency and the suppression of engine start shock can be satisfied. Specifically, when the motor running is performed by the two electric motors MG1, MG2 via the planetary gear device 102, if the known technique is employed, not only because the start compensation torque must be secured during running in preparation for the engine start, but also because the vehicle must run in a state of equilibrium of the output torque between the first electric motor MG1 and the second electric motor MG2, the second electric motor MG2 other than the first electric motor MG1 outputting the start compensation torque must secure the unusable torque corresponding to the start compensation torque during running, and the torque region corresponding the secured portion cannot be used for the motor running; however, this example eliminates the need for securing the start compensation torque and the unusable torque and therefore can satisfy both the maximum utilization of the power of the two electric motors MG1, MG2 for the motor running and the suppression of the engine start shock.

THIRD EXAMPLE

Figure 13:
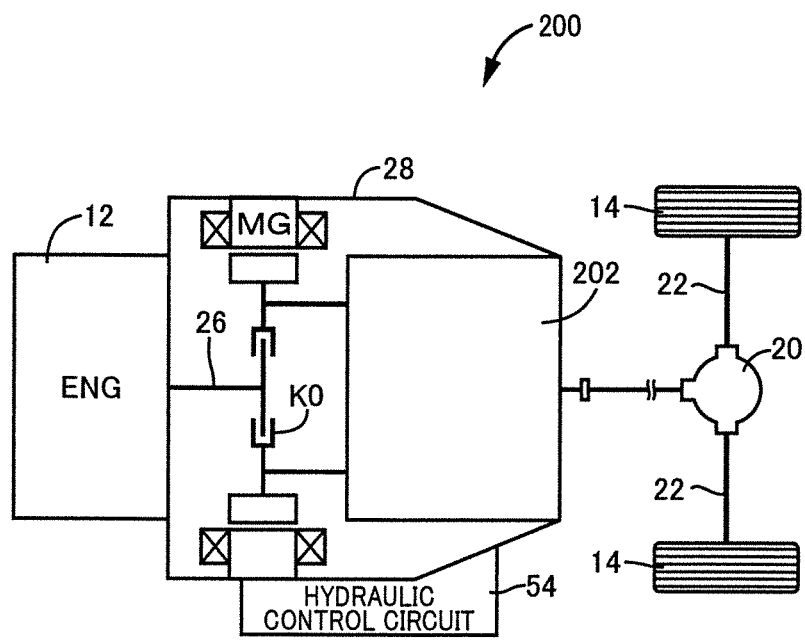
FIG. 13 is a diagram for explaining a general configuration of a further hybrid vehicle to which the present invention is applied.
Figure 14:
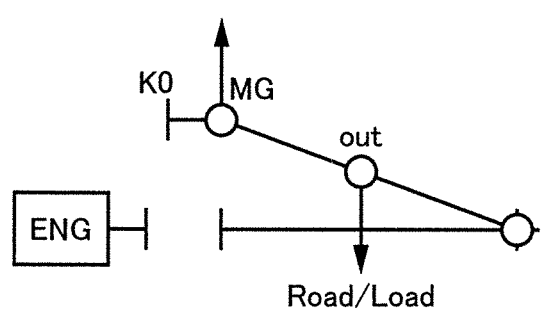
FIG. 14 is a collinear diagram capable of representing relative rotation speeds of rotating elements, the collinear diagram illustrating a running state at the time of the motor running.

FIG. 13 is a diagram for explaining a general configuration of another hybrid vehicle 200 (hereinafter referred to as a vehicle 200) to which the present invention is applied. As depicted in FIG. 13, the vehicle 200 includes a connecting/disconnecting clutch KO connecting/disconnecting a power transmission path between the engine 12 and an electric motor MG, and an automatic transmission 202 making up a portion of a power transmission path between the electric motor MG and the drive wheels 14. The vehicle 200 can perform the motor running for running by using only the electric motor MG as the drive force source for running with the connecting/disconnecting clutch KO released (motor running mode), as depicted in a collinear diagram of FIG. 14. The vehicle 200 can perform the engine running for running by using at least the engine 12 as the drive force source for running with the connecting/disconnecting clutch KO engaged (engine running mode).

Figure 15:
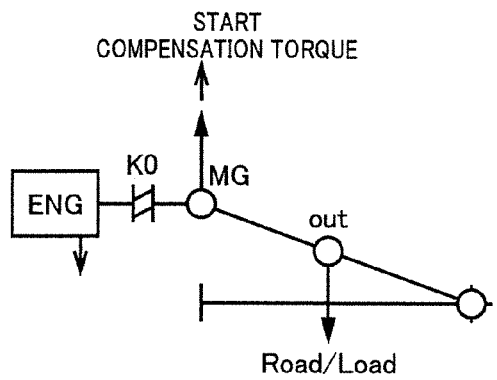
FIG. 15 is a diagram illustrating an example of state of each torque at the engine start on a collinear diagram like FIG. 14.

The following discusses the case that the engine start is requested during running in the motor running mode. In such a case, as depicted in FIG. 15, the electronic control device 80 engages the connecting/disconnecting clutch KO to raise the engine rotation speed Ne for the engine start. Since the torque raising the engine rotation speed Ne is the electric motor torque Tmg transmitted toward the engine 12 depending on a torque capacity of the connecting/disconnecting clutch K0, the torque acts as a deceleration torque transmitted to the drive wheels 14 and generates a drop in the drive torque. Therefore, the electric motor MG is caused to output a start compensation torque for offsetting the deceleration torque. As described above, the electric motor MG is an electric motor outputting the running torque at the time of the motor running and the starting torque at the engine start.

Figure 16:
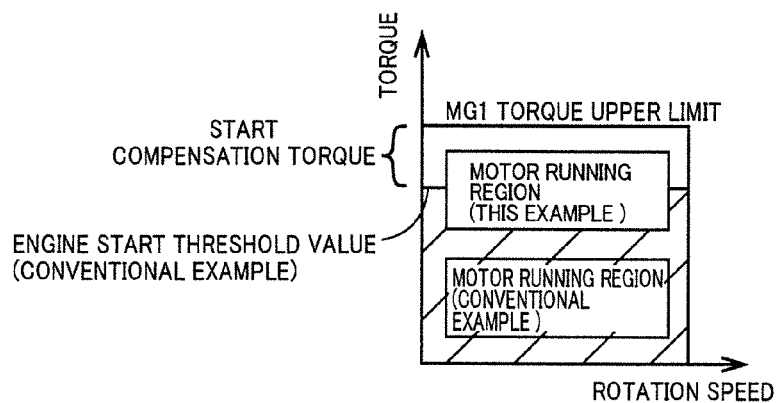
FIG. 16 is a diagram for explaining a motor running region by comparison between this example and a conventional example.

It is proposed as a known technique to start the engine while the engine start shock is avoided or suppressed by setting the engine start threshold value to a torque value acquired by subtracting the start compensation torque from an upper limit torque that can be output by the electric motor MG. On the other hand, if the known technique is employed, the electric motor MG must secure the start compensation torque during running in preparation for the engine start and, therefore, as depicted in FIG. 16 (see particularly, a conventional example), a motor running region is defined as a torque region equal to or less than an engine start threshold value acquired by subtracting the start compensation torque e from an MG upper limit torque of the electric motor MG In this regard, as depicted in FIG. 16, the vehicle 200 of this example employs a new technique of defining a region of the upper limit torque of the electric motor MG (the entire region in which the electric motor MG can output torque) as the motor running region. By employing such a new technique, the power of the electric motor MG can be utilized for the motor running to the maximum. On the other hand, in the high-load operation state of the electric motor MG (i.e., while even the starting torque is used for the motor running), the engine start shock may increase at the engine start. Thus, in the high-load operation state of the electric motor MG the electronic control device 80 of this example notifies a driver of being in the state.

As is the case with the example, this example can satisfy both the improvement in fuel efficiency from maximum utilization of the power of the electric motor MG for the motor running (i.e., expansion of the motor running region) and the suppression of engine start shock.

Although the examples of the present invention have been described in detail with reference to the drawings, the present invention is not limited to these examples and is applicable in other forms.

Figure 17:
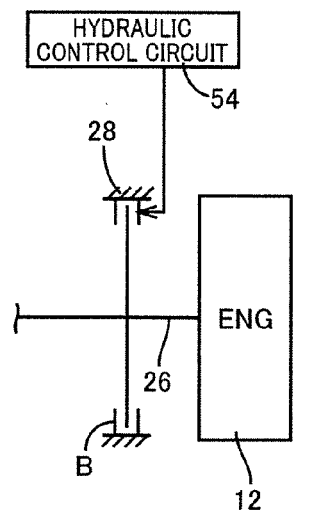
FIG. 17 is a diagram illustrating a brake as another example of the lock mechanism.

For example, although the meshing clutch 46 is exemplarily illustrated as the lock mechanism in the first example, this is not a limitation. The lock mechanism may be, for example, a one-way clutch permitting rotation in the forward rotation direction of the crankshaft 26 and preventing rotation in the negative direction, a multi-plate type hydraulic friction engagement device subjected to engagement control by a hydraulic actuator, a dry type engagement device, an electromagnetic friction engagement device (electromagnetic clutch) having an engagement state controlled by an electromagnetic actuator, and a magnetic powder clutch. FIG. 17 is a diagram of a brake B that is a hydraulic friction engagement device. In FIG. 17, the brake B has an engagement state thereof controlled between engagement and release depending on the brake oil pressure Pb supplied from the hydraulic control circuit 54, for example. The brake B may be slip-engaged as needed. When the brake B is released, the crankshaft 26 of the engine 12 is made relatively rotatable to the housing 28. On the other hand, when the brake B is engaged, the crankshaft 26 is fixed (locked) to the housing 28. The brake B may be a clutch selectively coupling the housing 28 and the crankshaft 26, for example.

Although the vehicle 10 of the first example includes the lock mechanism and can perform the motor running by the two electric motors MG1, MG2, the lock mechanism may not necessarily be included. If the lock mechanism is not included, the motor running is performed by the second electric motor MG2, for example, and when the present invention is applied, the start compensation torque can also be used for the motor running. The present invention is also applied to vehicles other than plug-in hybrid vehicles.

Although it is determined that the engine 12 must be started when the engine start is requested in the examples, this is not a limitation. For example, it is determined that the engine 12 must be started when the engine start is expected or when it is expected that the engine start is requested. The cases of the expectations correspond to the case that the charging capacity SOC is predicted to be smaller than the threshold value S1 based on a reduction speed of the charging capacity SOC of the electric storage device 52 and a difference between the actual charging capacity SOC and the threshold value S1, for example. Although the case of requesting the engine start is exemplarily illustrated as when the charging capacity SOC becomes smaller than the threshold value S1 in the examples, this is not a limitation and, for example, this case may be when the drive request amount further increases.

Although a notification is made to a driver that prompts elimination of the high-load operation state of the electric motors MG if the charging capacity SOC becomes smaller than the threshold value S1 in the examples (particularly in the flowchart of FIG. 7), this is not a limitation. For example, when the engine will soon be started, the notification to the driver may be started, or when the high-load operation state of the electric motors MG is generated, the driver may simply be notified of the state. Although if the charging capacity SOC becomes smaller than the threshold value S1, a sequence of the engine start control is started on the condition that the drive request amount is made smaller than the predetermined request amount in the examples, the engine start control may be started on the condition that the actual second electric motor torque Tmg2 is made smaller than predetermined torque corresponding to the predetermined request amount.

Although the vehicle 10 of the example is configured such that the three rotating elements of the differential mechanism are respectively coupled to the engine 12, the first electric motor MG1, and the second electric motor MG2, this is not a limitation. For example, the present invention is applicable to a differential mechanism having four or more rotating elements formed by coupling multiple planetary gear devices to each other. For example, if the differential mechanism has four rotating elements, the lock mechanism stops rotation of a rotating element that is other than the rotating elements coupled to the first electric motor MG1 and the second electric motor MG2 and that is coupled to the engine 12 or that is also not coupled to the engine 12. An electric motor other than the first electric motor MG1 and the second electric motor MG2 may be included. The engine 12 and the multiple electric motors are coupled directly or indirectly via a gear mechanism etc., to the rotating elements of the differential mechanism.

In the examples, the second electric motor MG2 may be coupled directly or indirectly via a gear mechanism etc., to the output gear 32, the intermediate output shaft 34, the drive wheels 14, etc., or may directly or indirectly be coupled to a pair of wheels different from the drive wheels 14. If the second electric motor MG2 is coupled to a pair of different wheels, the pair of the different wheels is also included in the drive wheels. In short, the drive wheels driven by the power from the engine 12 may be wheels different from the drive wheels driven by the power from the second electric motor MG2.

In the examples, the planetary gear devices 30 and 102 may be double-planetary planetary gear devices. The planetary gear devices 30 and 102 may be differential gear devices having a pair of bevel gears meshed with a pinion, for example.

The above description is merely an embodiment and the present invention can be implemented in variously modified and improved forms based on the knowledge of those skilled in the art.

NOMENCLATURE OF ELEMENTS 10, 100, 200: hybrid vehicle
12: engine
14: drive wheels
26: crankshaft
28: housing (non-rotating member)
30, 102: planetary gear device (differential mechanism)
46: meshing clutch (lock mechanism)
48: external power source
49: indicator
80: electronic control device (control device)
82: hybrid control portion
86: indication control portion
B: brake (lock mechanism)
MG: electric motor
MG1: first electric motor (electric motor)
MG2: second electric motor (electric motor)

The invention claimed is:

1. A control device of a hybrid vehicle including at least one electric motor, wherein
the control device is configured to permit an output torque of a first electric motor of the at least one electric motor to exceed an engine start threshold value of an engine when the first electric motor is powered by electric power stored in an electric storage device and an amount of electric power stored in the electric storage device is higher than a threshold power,
the control device is configured to limit the output torque of the first electric motor to the engine start threshold value when the first electric motor is powered by the electric power stored in the electric storage device and the amount of electric power stored in the electric storage device is less than the threshold power,
when the output torque of the first electric motor of the at least one electric motor is greater than the engine start threshold value, the control device is configured to provide a first notification to a driver including a recommendation to slow down the hybrid vehicle or release an accelerator of the hybrid vehicle and indicating a high-load operation state of the first electric motor in response to a charging capacity of the electric storage device becoming smaller than a first predetermined value, and to start the engine in response to the charging capacity of the electric storage device becoming smaller than a second predetermined value, wherein the second predetermined value is smaller than the first predetermined value, and
the output torque of the first electric motor is not limited to zero during a period from when the charging capacity of the electric storage device becomes smaller than the first predetermined value until when the control device starts the engine.

2. The control device of the hybrid vehicle of claim 1, wherein when the engine is started, the control device is configured to provide a second notification to the driver.

3. The control device of the hybrid vehicle of claim 1, wherein when the charging capacity of the electric storage device is smaller than the first predetermined value, the control device is further configured to:
determine whether a drive request amount is smaller than a predetermined drive request amount, and
start the engine in response to the drive request amount being smaller than the predetermined drive request amount.

4. The control device of the hybrid vehicle of claim 1, wherein when the charging capacity of the electric storage device is smaller than the first predetermined value, the control device is further configured to:
determine whether a drive request amount is smaller than a predetermined drive request amount, and
determine whether the charging capacity of the electric storage device is smaller than the second predetermined value in response to the drive request amount not being smaller than the predetermined drive request amount.

5. A control device of a hybrid vehicle including at least one electric motor, wherein
the control device is configured to provide a notification to a driver including a recommendation to slow down the hybrid vehicle or release an accelerator of the hybrid vehicle and indicating a high-load operation state of a first electric motor to a driver in response to the first electric motor of the at least one electric motor and a second electric motor of the at least one electric motor outputting a combined output torque and a charging capacity of an electric storage device becoming smaller than a first predetermined value, wherein the combined output torque includes a first output torque output by the first electric motor and a second output torque output by the second electric motor;
the control device is configured to start an engine in response to the charging capacity of the electric storage device becoming smaller than a second predetermined value, wherein the second predetermined value is smaller than the first predetermined value;
when the first electric motor and the second electric motor are powered by electric power stored in an electric storage device and an amount of electric power stored in the electric storage device is more than a threshold power, the control device is configured to permit the first output torque to exceed an engine start threshold value;
when the first electric motor and the second electric motor are powered by the electric power stored in the electric storage device and the amount of electric power is less than the threshold power, the control device is configured to limit the first output torque to the engine start threshold value, and
the output torque of the first electric motor is not limited to zero during a period from when the charging capacity of the electric storage device becomes smaller than the first predetermined value until when the control device starts the engine.

6. The control device of the hybrid vehicle of claim 5, wherein when the charging capacity of the electric storage device is smaller than the first predetermined value, the control device is further configured to:
determine whether a drive request amount is smaller than a predetermined drive request amount, and start the engine in response to the drive request amount being smaller than the predetermined drive request amount.

7. The control device of the hybrid vehicle of claim 5, wherein when the charging capacity of the electric storage device is smaller than the first predetermined value, the control device is further configured to:
   determine whether a drive request amount is smaller than a predetermined drive request amount, and
   determine whether the charging capacity of the electric storage device is smaller than the second predetermined value in response to the drive request amount not being smaller than the predetermined drive request amount.

8. A control device of a hybrid vehicle including at least one electric motor, wherein:
   the control device is configured to provide a notification indicating a high-load operation state of a first electric motor of the at least one electric motor to a driver in response to the first electric motor of the at least one electric motor and a second electric motor of the at least one electric motor outputting a combined output torque and a charging capacity of an electric storage device becoming is smaller than a first predetermined value, wherein the combined output torque includes a first output torque output by the first electric motor and a second output torque output by the second electric motor;
   the control device is configured to start an engine in response to the charging capacity of the electric storage device becoming smaller than a second predetermined value, wherein the second predetermined value is smaller than the first predetermined value;
   the notification includes a recommendation to slow down the hybrid vehicle or release an accelerator of the hybrid vehicle, and
   the output torque of the first electric motor is not limited to zero during a period from when the charging capacity of the electric storage device becomes smaller than the first predetermined value until when the control device starts the engine.

9. The control device of the hybrid vehicle of claim 8, wherein when the charging capacity of the electric storage device is smaller than the first predetermined value, the control device is further configured to:
   determine whether a drive request amount is smaller than a predetermined drive request amount, and
   start the engine in response to the drive request amount being smaller than the predetermined drive request amount.

10. The control device of the hybrid vehicle of claim 8, wherein when the charging capacity of the electric storage device is smaller than the first predetermined value, the control device is further configured to:
   determine whether a drive request amount is smaller than a predetermined drive request amount, and
   determine whether the charging capacity of the electric storage device is smaller than the second predetermined value in response to the drive request amount not being smaller than the predetermined drive request amount.

* * * * *